(12) United States Patent
Eickemeyer et al.

(10) Patent No.: US 6,393,552 B1
(45) Date of Patent: *May 21, 2002

(54) METHOD AND SYSTEM FOR DIVIDING A COMPUTER PROCESSOR REGISTER INTO SECTORS

(75) Inventors: Richard James Eickemeyer, Rochester, MN (US); Nadeem Malik, Austin, TX (US); Alan Vicha Pita, Austin, TX (US); Avijit Saha, Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,718

(22) Filed: Jun. 19, 1998

(51) Int. Cl.[7] .................................................. G06F 9/34
(52) U.S. Cl. ........................ 712/216; 712/210; 712/217; 712/219
(58) Field of Search ................................. 712/210, 216, 712/217, 219

(56) References Cited

U.S. PATENT DOCUMENTS

| | | | |
|---|---|---|---|
| 5,497,499 A | 3/1996 | Garg et al. ................. | 712/217 |
| 5,519,841 A | 5/1996 | Sager et al. ................. | 711/202 |
| 5,524,262 A | 6/1996 | Colwell et al. ................ | 712/23 |
| 5,548,776 A | 8/1996 | Colwell et al. ............. | 712/217 |
| 5,560,032 A | 9/1996 | Nguyen et al. ............... | 712/23 |
| 5,574,928 A | 11/1996 | White et al. ................... | 712/23 |
| 5,581,717 A | 12/1996 | Boggs et al. ............... | 712/208 |
| 5,590,295 A | 12/1996 | Deosaran et al. ........... | 712/217 |
| 5,590,352 A | 12/1996 | Zuraski et al. ................ | 712/23 |
| 5,596,731 A | 1/1997 | Martinez et al. ............ | 710/305 |
| 5,600,848 A | 2/1997 | Sproull et al. ................ | 712/42 |
| 5,630,149 A | * 5/1997 | Bluhm ........................ | 712/217 |
| 5,752,271 A | * 5/1998 | Yung .......................... | 711/171 |
| 5,974,524 A | * 10/1999 | Cheong et al. ............... | 712/23 |
| 5,983,342 A | * 11/1999 | Tran ........................... | 712/218 |

* cited by examiner

Primary Examiner—Kenneth S. Kim
(74) Attorney, Agent, or Firm—Thomas E. Tyson; Edmond A. DeFrank

(57) ABSTRACT

A method and implementing system are provided in which processor registers are divided into sectors and such sectors are individually renamed. In one embodiment, the register file is divided into sectors such that the smallest accessible unit for an instruction set in each register can be uniquely addressed and renamed thereby providing additional effective registers for renaming.

23 Claims, 4 Drawing Sheets

METHOD AND SYSTEM FOR DIVIDING A COMPUTER PROCESSOR REGISTER INTO SECTORS

RELATED APPLICATIONS

The present application is related to application entitled "SECTOR RENAMING FOR BUFFERING FREQUENTLY USED VALUES" application Ser. No. 09/100, 717, now issued U.S. Pat. No. 6,336,160, filed on even date herewith and assigned to the assignee of the present application.

FIELD OF THE INVENTION

The present invention relates generally to information handling systems and more particularly to an improved methodology for referencing information in registers of computer processing units.

BACKGROUND OF THE INVENTION

High performance superscalar computer processors use a technique known as "register renaming" to facilitate out-of-order instruction execution. In general, register renaming refers to a method by which processor registers may be shared. For example, if a first program requires the use of a specific register, and a second program also requires the use of that same register while the register is still being used by the first program, the processor will redefine one of its unused registers as a second copy of the specific register, and the processor will track and manage the specific register and the renamed register relative to the information contained in the registers and the associated instructions.

Every computer program consists of a sequence of small atomic actions called instructions which collectively, and in sequence, comprise the program. Though, in the program's object file, these instructions exist in a formal sequence, when executed on a superscalar computer processor, the program instructions may be executed out of order by the processor, provided the required dependencies inside the program are not violated. For example, if instruction B references a particular register, and instruction A, which precedes B in program flow, also writes to that register, B must wait for A to complete. This ordering requirement is referred to as a dependency. The fewer the dependencies, the faster the instructions can be delivered to the execution units. Dependencies can also arise due to implementation decisions which have the same detrimental effect on performance.

A problem arises when instructions are executed simultaneously and/or out-of-order. It is no longer sufficient to name a result in this system by the number of the destination register since multiple results may be concurrently outstanding for that register, and there is a strict ordering between the results as dictated by the program sequence. To manage that problem, superscalar processors typically rename the source and destination operands of each program instruction with a code corresponding to an implementation level register (referred to as the "renamed register") that can be used to correctly order the values as they are produced by the various parts of the execution stage.

To date, processors have implemented register renaming by assigning an alias code to each operand on the basis of the register identifier and without regard to the portion of the bits of that register which are actually accessed by the instruction. That practice reduces the availability of the renaming registers for other instructions which, in turn, causes a performance problem when subsequent instructions use entirely disjointed portions of a single data register.

Processors architecturally deal with more than one size of data values such as 8, 16, 32 and 64-bit integer operations. For example, the typical RISC (Reduced Instruction Set Computer) processors, such as the PowerPC processor, was introduced as 32-bit architectures and later extended to 64-bits. In this case, the upper and lower 32-bit halves of the 64-bit register are not equally accessible. Existing applications written for the 32-bit processors must still run on the 64-bit processors. When renaming takes place on the full register (64-bits), half of the renaming register bits are wasted when running 32-bit programs or when using 32 or less bits for data values. Full register renaming thus results in unnecessary wastage of register space and this, in turn, results in significant slow-down in program execution when code using 8, 16 or 32 bits of data values, and instruction execution has to be stalled due to an unavailability of rename registers.

Accordingly, there is a need for an enhanced method and processing apparatus which is able to provide increased register efficiencies and improved processor performance.

SUMMARY OF THE INVENTION

A method and apparatus is provided for sectoring processor registers and renaming the resulting sectored registers individually. In one embodiment, the register file is divided into sectors such that the smallest accessible unit for an instruction set in each register can be uniquely addressed and renamed. Since most register data values do not utilize all the bits of a given register, such bits that form a register sector can then be utilized to provide additional registers for renaming.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
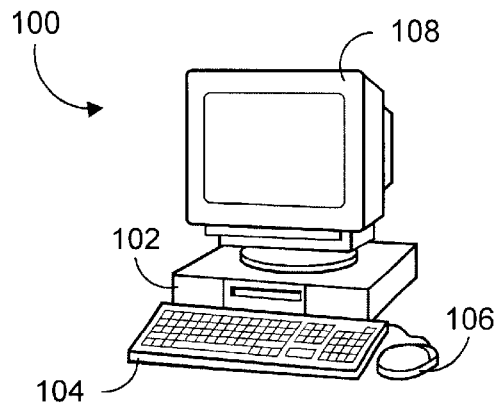
FIG. 1 is a diagram of a partial simplified information processing system in which the present invention may be implemented.

In order to further illustrate the disclosed methodology, reference is made to the attached drawings in which FIG. 1 presents a portion of an exemplary computer system in which the present invention may be implemented. As shown, a computer station 100 includes a CPU (central processor unit) enclosure 102 which typically encloses much of the electronics of the system. Also illustrated is a keyboard 104 and a pointing device or "mouse" 106. The keyboard 104 and mouse 106 are arranged to receive inputs to the system from an operator which may be responsive to and in conjunction with programmed presentations appearing on a display device 108. The display device 108 is shown as a CRT in the present example although other display devices such as liquid crystal displays or active matrix displays typically used with portable systems may also be implemented. The present invention may be used in desktop, laptop, workstation or larger systems as well.

Figure 2:
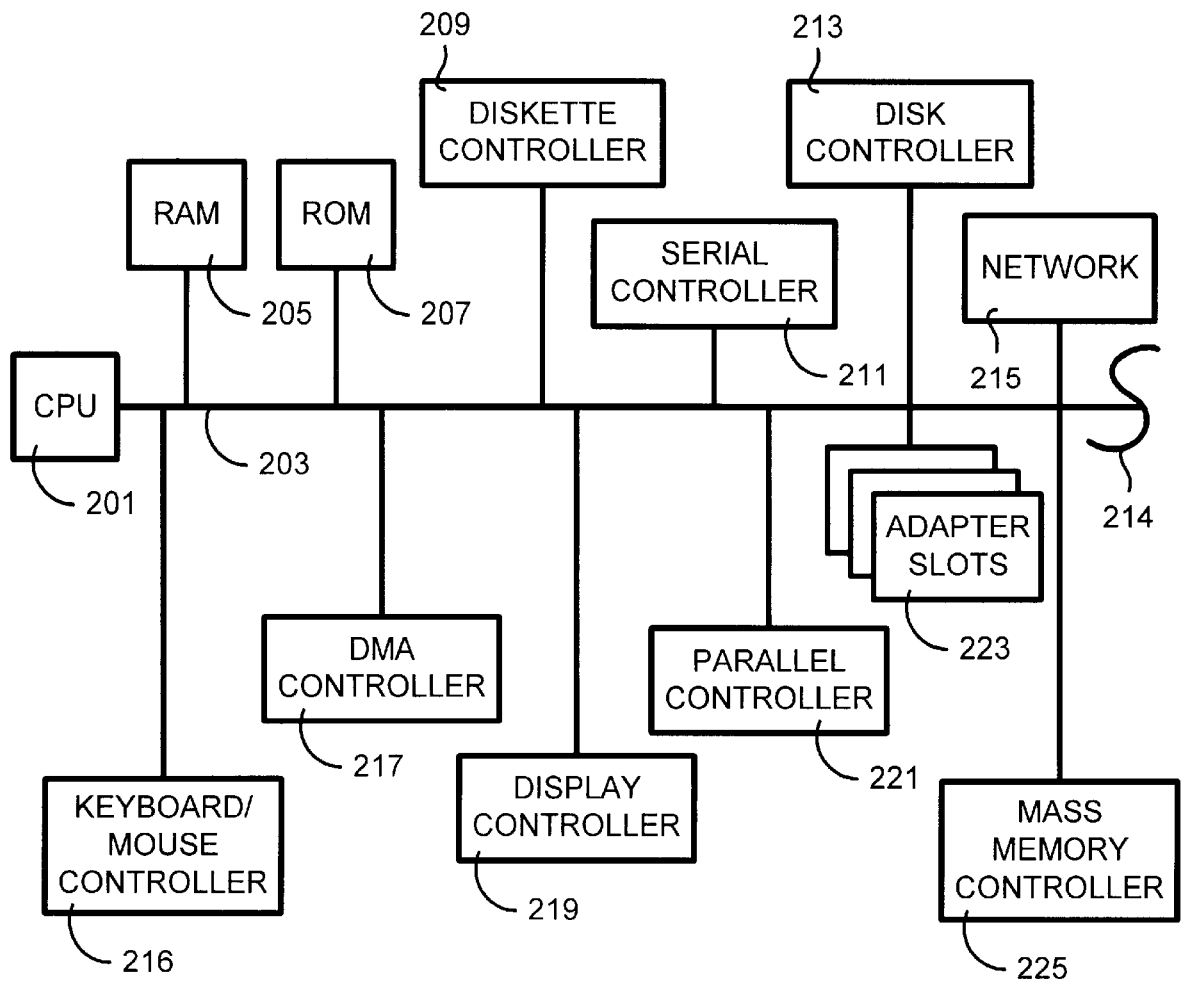
FIG. 2 is a high level block diagram showing selected components and subsystems within the exemplary system illustrated in FIG. 1.

In FIG. 2, a CPU chip or integrated circuit 201 is shown connected to a main bus 203. For the sake of simplicity and in order not to unduly obfuscate the teachings disclosed herein, the example presented shows only a single bus although it is understood that the implementing system may include a plurality of busses and connecting bridge circuits and networks. As illustrated, a RAM (random access memory) unit 205 and a ROM (read only memory) unit 207 are connected to the bus 203. The bus 203 is also coupled to various system controllers including a diskette controller 209 for controlling one or more floppy diskettes, a serial controller 211 typically used in communication functions, and a disk controller 213 for controlling one or more hard drive devices. A network interface 215 is also illustrated as being connected to the bus 203. The network interface 215 may couple the system shown to a hardwired network or through a modem to a more extensive network such as the Internet. Further the bus 203 may be extended 214 to include other connections to even more system devices and functional subsystems.

The bus 203 is also arranged for connection to a keyboard/mouse controller 216, a DMA (direct memory access) controller 217, a display controller 219 for interfacing with one or more display devices, and a parallel controller 221 typically used for connection to one or more printer devices. In addition, the bus 203 may includes adapter slots 223 for being coupled with adapter devices, and a mass memory controller 225 for use in controlling mass memory which may be, for example CD ROM memory or other large scale memory devices. CPU 201 fetches, decodes and executes instructions and transfers information to and from other system resources, such as system RAM memory 205, controller 209, etc., which are coupled to the system bus 203 or coupled through corresponding bus systems in more extensive arrangements.

Figure 3:
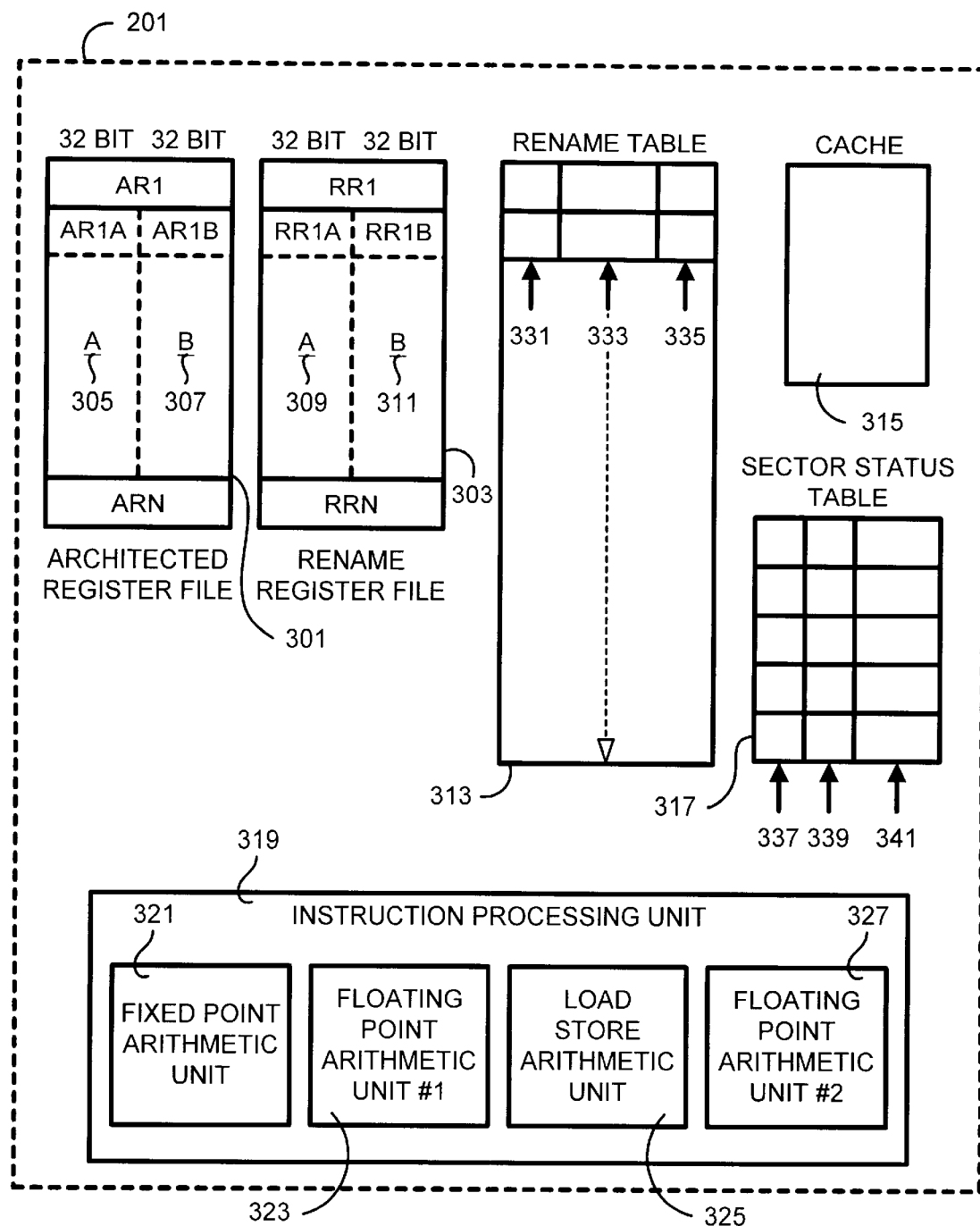
FIG. 3 is a block diagram illustrating in greater detail selected components within the CPU of FIG. 2.

In FIG. 3, selected components of the CPU unit 201 are illustrated in greater detail. The CPU 201 includes an Architected Register File (ARF) 301, which is 64 bits wide in the present example although other sizes may also be implemented. The ARF 301 is further divided into two 32-bit sectors designated Sector A 305 and Sector B 307. As shown, the registers are divided into only two 32-bit sectors although smaller sectors are also possible. The individual registers in the Architected Register File (ARF) 301 are designated "AR1" through "ARN". Similarly, the CPU 201 further includes a second register file designated the Rename Register File (RRF) 303. The RRF 303 is also divided into two 32-bit sectors designated Sector A 309 and Sector B 311. As shown, the registers are divided into only two 32-bit sectors although smaller sectors are also possible. The individual registers in the RRF 303 are designated "RR1" through "RRN". Each sector A 309 and B 311 provides an independent 32-bit rename register as shown such as RR1A and RRLB.

The CPU also includes a Rename Table 313, a cache memory 315, and a Sector Status Table 317. An Instruction Processing Unit 319 is also illustrated. The Instruction Processing Unit 319 includes a Fixed Point Arithmetic Unit 321, a Floating Point Arithmetic Unit #1 323, a Load Store Arithmetic Unit 325 and a Floating Point Arithmetic Unit #2 327, in the present example. The use and implementation of the ARF 301, internal cache 315, and Instruction Processing Unit 319 are well known in the art. The RRF 303 has typically been used for allowing the CPU 201 to execute instructions in a non-sequential fashion, often referred to as "out-of-order", via the use of additional registers contained therein. A typical operation of circuitry similar to that illustrated in FIG. 3 is explained in greater detail in U.S. Pat. No. 5,652,774, which is assigned to the assignee of the present invention and which is included herein by reference. In the present example, however, the ARF 301 and the RRF 303 are divided into two 32-bit sectors and the CPU further includes a Rename Table 313 and a Sector Status Table 317.

The renaming register pool, i.e. the group of registers available for renaming, consists of a number of 32-bit registers. These rename registers are used independently for each 32-bit register sector that needs to be renamed. This pool consists of A sectors 309 and B sectors 311 in the RRF 303, and A sectors 305 in the ARF 307.

An exemplary implementation of the register renaming methodology disclosed herein consists of an architecture that uses 64-bit registers. In this exemplary method for sector renaming, the register is renamed on a sector by sector basis instead of on a full register level. Status bits are associated with each 32-bit sector of the registers in the example, although sectors of different sizes may be used in other implementations. The "status" indicates whether the sector has been modified, or is not changed by a particular instruction. When manipulating entire registers, all sectors are marked with the same status and the hardware operates in the usual manner. When sectors are manipulated, it is clear from the sector status bit or bits, which parts are modified and which are not. If the entire register is modified by an instruction, two rename register sectors are used. If the instruction modifies only one sector, then only one rename register sector is used. An instruction is not held if waiting for one sector due to a pending modification of a different sector of the register.

In the event that an instruction makes use of the entire 32-bit register, the 4 bytes will be renamed with the same alias code, and the effect is identical to the non-sectored renaming scheme. In the event that an instruction only makes use of one of the two sectors of the register, only the sector being used is renamed. As a result, interlocks on previous and subsequent instructions using the other sectors of that particular register which would otherwise be introduced in a non-sectored renaming scheme are eliminated.

The "A" sector or the most significant sector of the ARF 301 is the only sector available for renaming from the architected registers, i.e. the least significant sector 305 of the register 301 is not used for renaming. The first column 331 in the Rename Table 313 contains the architected register number, the second column 333 contains the instruction address and the third column 335 contains architected register or rename register number plus the sector mask. There is one sector mask bit for each sector. In the Sector Status Table 317, there is one entry per register. The first column 337 of the Sector Status Table 317 contains the sign extend bit, the second column 339 contains the sector use bits (of which there is one bit for each sector), and the third column 341 contains the register number.

Figure 4:
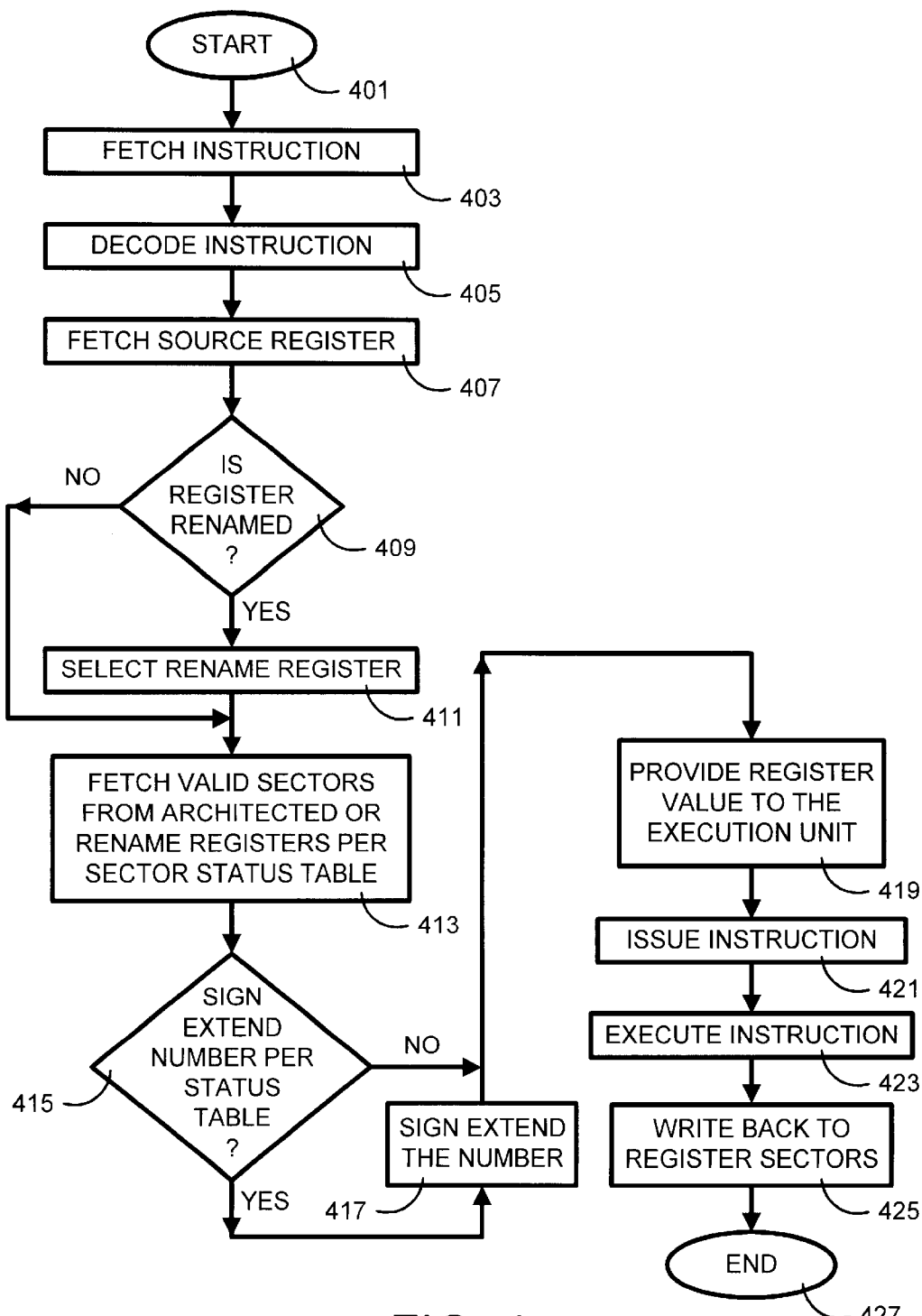
FIG. 4 is a flowchart illustrating an operational sequence for a register used as a source register in the processing of an instruction.

FIG. 4 is a flowchart illustrating an operational sequence for a register used as a source register in the processing of an instruction. In FIG. 4, when the process begins 401, an instruction is fetched 403 and decoded 405. The source register is then fetched 407 and a decision is made to determine if the register has been renamed 409. This step determines if the register number is listed in the rename table 313 and the current instruction address is greater than the address in the rename table. If not, the process continues by fetching 413 valid sectors from the architected registers 301 or renamed registers 303 in accordance with the Sector Status Table 317. If the source register was renamed 409 then the process selects the rename register 411 and then proceeds to fetching the valid sectors 413. Next, a determination is made 415 as to whether to sign-extend the number 337 as determined from the Sector Status Table 317. If not, register value is provided 419 to the execution unit (not shown) in the CPU 201. If the number is to be sign-extended 417 per the Sector Status Table 317, then the number is sign-extended prior to providing the register value to the execution unit. Next the instruction is issued 421, executed 423 and the result is written back to the register sectors 425 as the process ends 427.

Figure 5:
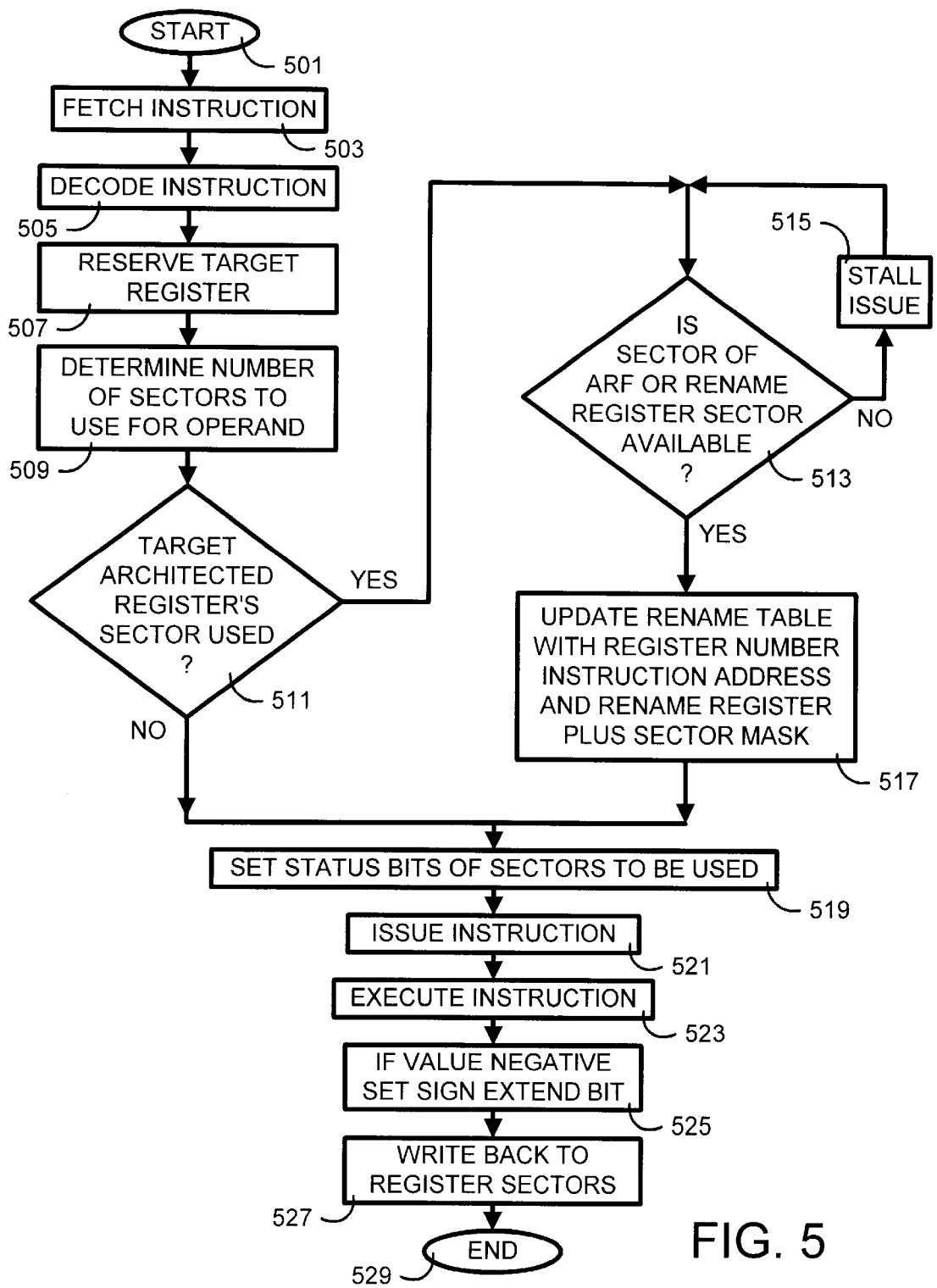
FIG. 5 is a flowchart illustrating an operational sequence for a register used as a target register in the processing of an instruction.

FIG. 5 is a flowchart illustrating an operational sequence for a register used as a target register in the processing of an instruction. As the process is initiated 501, an instruction is fetched 503, decoded 505 and the target register is reserved 507. Next, the number of sectors required to be used for the operand is determined 509. Next, it is determined 511 if the target architected register's sector is being used per the Sector Status Table 317. It is noted that only the least significant sector used for the architected register's use in an instruction and the remaining sectors are used for renaming. If the target architected register's sector is not being used, then the process continues to set status bits of the sectors to be used 519. If the target architected sector is being used 511, then it is determined if a sector of the architected register file (ARF), or a sector of the rename register file (RRF), is available 513. If the sector is not available 513, the process stalls the issue 515 until it becomes available. If the architected or rename register is available 513, then the Rename Table 313 is updated 517 with the register number 331, instruction address 333 and Rename Register plus sector mask 335 prior to setting the status bits of the sectors to be used 519. After setting the status bits 519, the instruction is issued 521 and executed 523. If the data value to be stored in the register is negative, the sign extend bit 337 is set 525 and the value is written back to the register sectors 527 as the process ends 529.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and included or integrated into a processor or CPU or other larger system integrated circuit or chip. The methodology may also be implemented solely in program code stored on a CD, disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for referencing registers of a processor, said method comprising:
    dividing at least one of said processor registers into a plurality of individually addressable sectors;
    determining sector-related indicia representative of predetermined characteristics of each of said plurality of sectors; and
    renaming each of said plurality of individually addressable sectors based on the sector-related indicia.

2. The method as set forth in claim 1 wherein said processor registers are organized into architected register files and rename register files.

3. The method as set forth in claim 1 wherein said processor registers are divided into equally sized sectors.

4. The method as set forth in claim 3 wherein said registers are 64-bit registers and said sectors are 32-bit sectors.

5. The method as set forth in claim 1 wherein said registers are divided into sectors smaller than 32-bit sectors.

6. The method as set forth in claim 1 and further including:
    establishing a rename memory means, said rename memory means including means for remembering characteristics associated with each of said sectors.

7. The method as set forth in claim 6 wherein said rename memory means comprises a rename table.

8. The method as set forth in claim 1 and further including:
    establishing a status memory means, said status memory means being effective for remembering a use status of each of said sectors.

9. The method as set forth in claim 8 wherein said status memory means comprises a sector status table.

10. The method as set forth in claim 1 and further including:
    establishing a sign-extend memory means, said sign-extend memory means being effective for remembering a sign-extend characteristic associated with said sectors.

11. The method as set forth in claim 10 wherein said sign-extend memory means is comprised of at least one bit status in a sector status table.

12. The method as set forth in claim 1 wherein said step of dividing includes physically dividing at least one of said processor registers.

13. The method as set forth in claim 12 wherein each of said sectors has a size dependent on a predetermined sector condition.

14. A processing unit comprising:
    at least one register file, said register file comprising at least one register, said register being divided into a plurality of individually addressable sectors;
    a memory device arranged for storing sector-related indicia, said sector-related indicia being representative of predetermined characteristics of said sectors; and
    a rename module that renames each of said plurality of individually addressable sectors based on the sector-related indicia.

15. A storage medium including machine readable indicia, said storage medium being selectively coupled to a reading device, said reading device being selectively coupled to processing circuitry within a computer system, said reading device being selectively operable to read said machine readable indicia and provide program signals representative thereof, said program signals being effective to enable said computer system to reference processor registers within said computer system by:
    dividing at least one of said processor registers into a plurality of individually addressable sectors;
    determining sector-related indicia representative of predetermined characteristics of each of said plurality of sectors; and
    renaming each of said plurality of individually addressable sectors based on the sector-related indicia.

16. A method for using a processor for processing instructions, said method comprising:

decoding an instruction;

reserving a target register for said instruction, said target register being comprised of a plurality of individually addressable sectors;

determining a number of sectors to be used for an operand of said instruction;

storing sector-related indicia representative of predetermined characteristics of said sectors;

designating sectors to be used in the method;

renaming each of said plurality of individually addressable sectors based on the sector-related indicia; and setting status bits of said sectors to be used in a sector status memory means.

17. The method as set forth in claim 16 and further including:

executing said instruction; and writing back a result of said executing to appropriate register sectors.

18. The method as set forth in claim 7 and further including setting a sign-extend bit if said result is negative.

19. A method for using a processor for processing instructions, said method comprising:

selecting a source register for an instruction being processed, said source register being divided into a plurality of individually addressable sectors, each of said plurality of individually addressable sectors having a predetermined size;

fetching valid sectors from said source register;

storing sector-related indicia representative of predetermined characteristics of said sectors;

renaming each of said plurality of individually addressable sectors based on the sector related indicia; and executing said instruction.

20. The method as set forth in claim 19 and further including:

writing back a result of said executing to said valid sectors.

21. The method as set forth in claim 19 wherein said fetching is accomplished by referencing a sector status memory means.

22. The method as set forth in claim 21 wherein said sector status means is a sector status table.

23. A method of subdividing a processor register of a computer processor, comprising:

subdividing said processor register into a plurality of individually addressable sectors;

storing sector-related indicia representative of predetermined characteristics of said sectors;

determining a size of each of said plurality of sectors representing the sector-related indicia using a predetermined instruction; and renaming each of said plurality of individually addressable sectors based on the determined size representing the sector related indicia.

* * * * *